United States Patent
Wegman

(10) Patent No.: US 7,324,812 B2
(45) Date of Patent: Jan. 29, 2008

(54) MOBILE COMMUNICATIONS DEVICE WITH HOLD MODE

(75) Inventor: Paul Martin Wegman, Pittsford, NY (US)

(73) Assignee: Xerox Corporation, Norwalk, CT (US)

( * ) Notice: Subject to any disclaimer, the term of this patent is extended or adjusted under 35 U.S.C. 154(b) by 57 days.

(21) Appl. No.: 11/083,963

(22) Filed: Mar. 21, 2005

(65) Prior Publication Data

US 2006/0211443 A1   Sep. 21, 2006

(51) Int. Cl.
  *H04M 3/42* (2006.01)
  *H04M 1/00* (2006.01)
(52) U.S. Cl. .................................. 455/416; 455/550.1
(58) Field of Classification Search ................ 455/416, 455/550.1
  See application file for complete search history.

(56) References Cited

U.S. PATENT DOCUMENTS 5,930,338 A * 7/1999 McKendry et al. ...... 379/88.25
6,021,176 A * 2/2000 McKendry et al. ........... 379/35
6,807,256 B1 * 10/2004 Holt et al. ............... 379/88.19
2003/0123626 A1 * 7/2003 Beckmann et al. ...... 379/93.35
2003/0186686 A1 * 10/2003 Yang et al. .............. 455/414.1
2004/0209606 A1 * 10/2004 Cleary et al. ............... 455/415
2005/0124328 A1 * 6/2005 Thomas et al. ............. 455/416

* cited by examiner

Primary Examiner—Joseph Feild
Assistant Examiner—Michael Faragalla
(74) Attorney, Agent, or Firm—Oliff & Berridge, PLC

(57) ABSTRACT

A mobile communications device may incorporate a hold routine to hold incoming calls for a period of time, and allow a user to answer the call at his convenience. The hold indicator, such as a single ring or a vibration, to show that the mobile communications device is in the hold mode. Using the hold mode, mobile communications may be used in situations wherein it is difficult to accept a call immediately, by delaying the initiation of the conversation between the caller and the user for the predetermined period of time.

20 Claims, 8 Drawing Sheets

MOBILE COMMUNICATIONS DEVICE WITH HOLD MODE

BACKGROUND

This invention is directed to mobile communication devices.

Mobile communication devices, such as cell phones, may ring to alert the user that an incoming call has been received. Often, however, the ringing may take place in a situation that is awkward for the user to answer the incoming call. Meetings, for example, are often disrupted by ringing cell phones. Other situations in which the mobile phone user may not be able to readily respond to the incoming call may include libraries, theaters, churches, and hospitals.

At present, one option for the mobile phone user in such situations may be to allow the phone to continue ringing, after which the caller may be invited to leave a voice message. After the caller leaves the voice message, the call may be discontinued. The mobile phone user may put the phone in a mute or silent mode, so that the ringing is silenced, allowing the voice mail service to record the voice message from the incoming caller.

SUMMARY

However, when the user allows the voice mail to take a message rather than answer the call directly, the opportunity to speak directly to the caller may be lost because the call may be discontinued after the caller leaves the voice message. When the user finally gets around to receiving and listening to the voice message left by the caller, and returns the call, the caller may no longer be available to take the return call, so that the opportunity to speak directly with the caller may be lost or postponed. This may result in less efficient productivity in work situations, and reduced communications in personal relationships.

Various exemplary systems and methods are described which may provide an alternative mode for handling an incoming call in situations in which the user cannot readily answer the call. Exemplary systems and methods may provide a mobile communications device with a hold mode. The hold mode holds the caller on the line for an interval of time, within which the user may be able to exit the situation and then answer the call. This may allow the opportunity for the user to speak directly with the caller, at a later time which is more convenient for the user.

The mobile communications device may comprise a hold mode selector that selects a hold mode for the mobile communications device, and a microprocessor that invokes a hold mode routine when the hold mode selector is selected. The mobile communications device may further include a device which initiates a hold indicator, such as a distinct ring or silent vibration, wherein the hold indicator indicates that the hold mode is active. The mobile communications device may further include a microphone disabler, which disables the microphone to avoid transmitting ambient sounds to the caller.

Several different modes may be employed to implement various exemplary systems and methods. These modes may include a first mode wherein the user selects the hold mode before the user enters the situation in which he or she will be unable to take the incoming call, for example, before entering a church. In this first mode, the mobile communications device may ring or vibrate only once, before generating a hold greeting which directs the caller to stay on the line, as the respondent will answer within a few moments. In a second mode, the mobile communications device may ring or vibrate as usual, and may enter the hold mode upon depression of a hold mode selector by the user, which may then cause the mobile communications device to generate the hold greeting and hold the call.

The hold mode may loop and therefore may last indefinitely, or it may invoke a voice message routine after a predefined period of time. The voice message routine may then invite the caller to leave a voice message, before disconnecting the call.

These and other features and advantages are described in, or are apparent from, the following detailed description.

BRIEF DESCRIPTION OF THE DRAWINGS

Various exemplary details are described with reference to the following figures, wherein.

DETAILED DESCRIPTION

A mobile communications device may be equipped with a hold mode that allows a user to direct the mobile communications device to hold an incoming call on a connection for a predefined period of time, during which the user may prepare to receive the incoming call.

Figure 1:
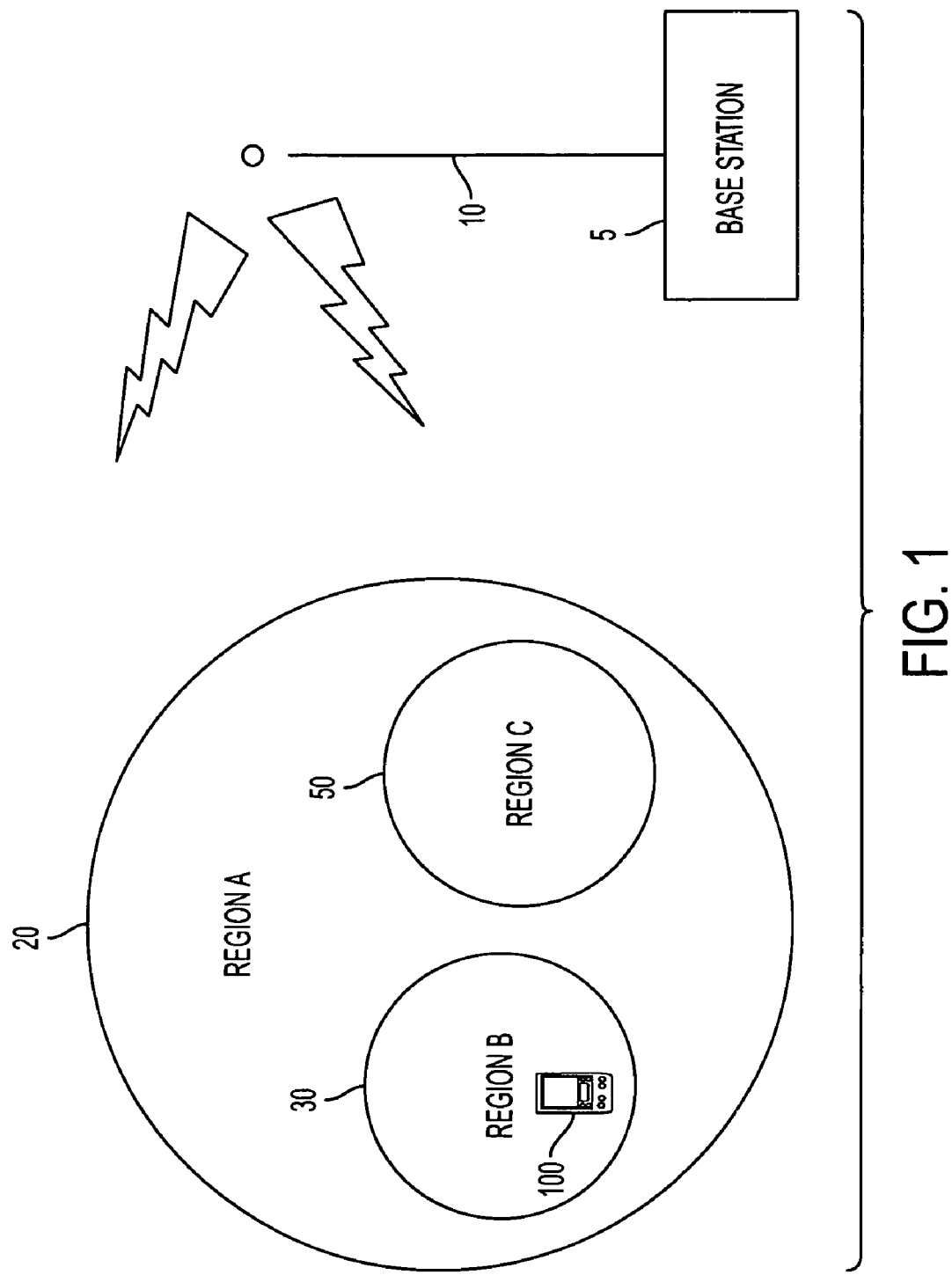
FIG. 1 illustrates an exemplary mobile communications device operating within a range of a transmission/reception antenna.

FIG. 1 depicts a scenario within which an exemplary mobile communications device with hold mode 100 may be deployed. The mobile communications device with hold mode 100 may communicate with a transmission/reception antenna 10 associated with a base station 5, which may transmit and receive communication information to and from one or more mobile communications devices. A region 20, specified as "region A," may correspond to an entire region within which the mobile device with hold mode 100 may transmit and receive information from the transmission/reception antenna 10 and base station 5. When the mobile communications device with hold mode 100 is within a region 50 specified as "region C," the mobile communications device with hold mode may be configured to accept no incoming calls, and instead may direct all incoming calls to a voice message service via transmission/reception antenna 10. Region 50 may be, for example, a workplace where personal calls are not encouraged, or the home of the user within which the user prefers not to be interrupted by telephone calls.

Another region 40, specified as "region B" in FIG. 1, may correspond to locations or situations wherein the user may prefer to receive the incoming calls, but may not be able to readily answer the calls. Region 40 may be a business meeting, a library, a theater or a church, for example. When the user is located in region B, he may prefer to hold the call for some predefined amount of time, during which he may prepare to answer the call personally. This preparation may include exiting the church or business meeting, swallowing a bite of lunch, clearing his nose or throat, or searching for a relevant document. When the user is located in region 40, he may configure the mobile communication device to be in a hold mode in which the caller is presented with a hold greeting and invited to hold the line for a few moments within which the user will answer the call. Accordingly, region 40 offers the advantage compared to region 50, in that the user may still have the opportunity to speak directly with the incoming caller after a hold period, whereas in region 50, this opportunity is not available because the all incoming calls are automatically directed to the voice message service.

Figure 2:
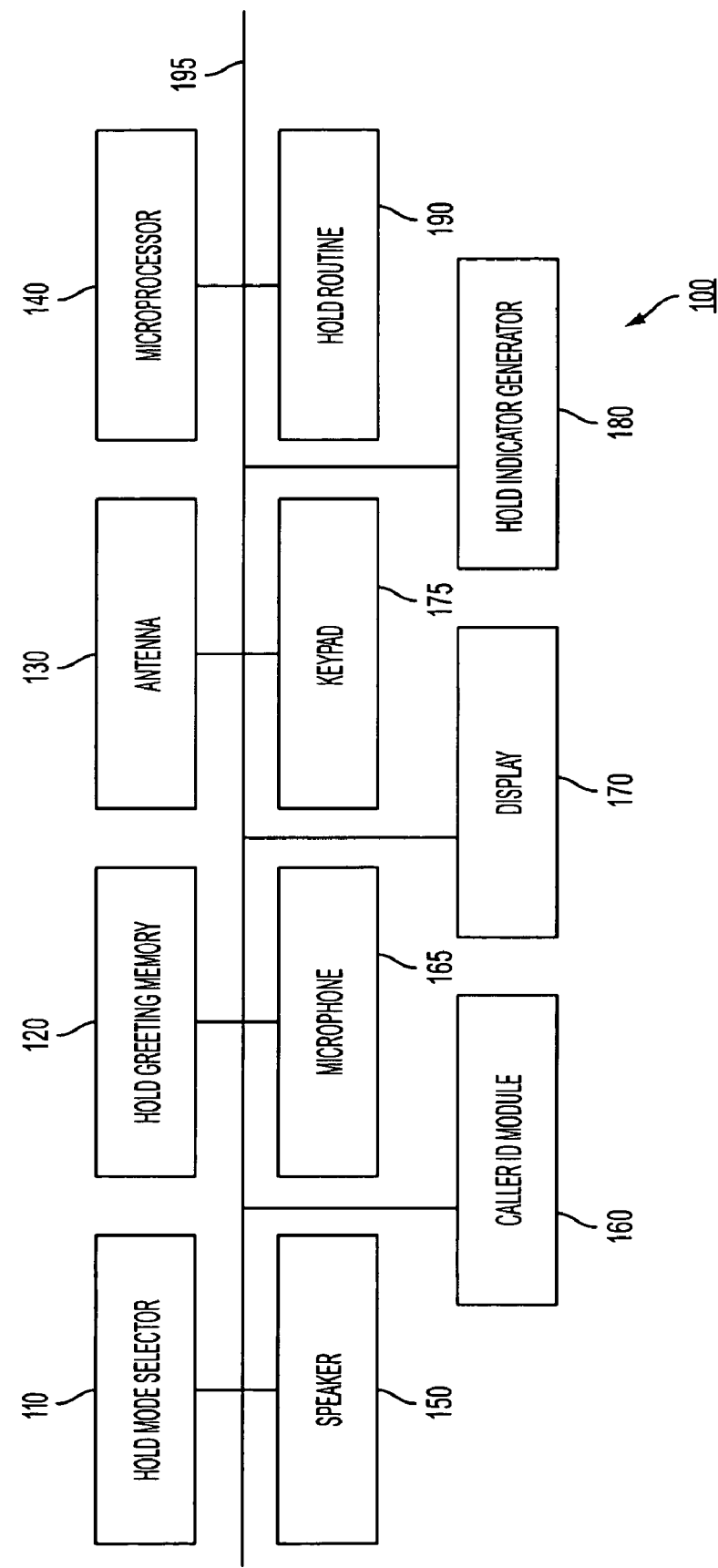
FIG. 2 is a block diagram of an exemplary mobile communications device with hold mode.

FIG. 2 is a block diagram illustrating details of the exemplary mobile communications device with hold mode 100. The mobile communications device with hold mode 100 may include a hold mode selector 110, a hold greeting memory 120, an antenna 130, a microprocessor 140, a speaker 150, a caller identification module 160, a microphone 165, a display 170, a keypad 175, a hold indicator generator 180, and a hold routine 190. The foregoing components may communicate through a bus 195, or may be implemented as components of an application-specific integrated circuit (ASIC). Any combination of hardware and software may be used to implement the components of mobile communications device with hold mode 100 as illustrated in FIG. 2.

Hold mode selector 110 may be a dedicated key on keypad 175, which may be used to select or invoke the hold mode. Alternatively, hold mode selector 110 may invoke the hold mode upon the depression of a predefined sequence of keys on keypad 175. In yet another alternative, the hold mode selector 110 may invoke the hold mode upon audible detection of a signal word or words, such as "set hold mode ON", spoken into microphone 165, for example, during a setup or configuration phase of operation of the mobile communication device with hold mode 100. It should be understood that these alternatives are non-limiting, and that any other suitable method of invoking or activating the hold mode may be employed.

Hold greeting memory 120 may be a volatile or non-volatile memory which stores a hold greeting that the user would like to use to greet the incoming caller. The hold greeting may be something such as "Please hold. Henry will answer shortly." This greeting may be recorded previously, for example, upon entering region 40, or upon powering on mobile communications device with hold mode 100, may be recorded in the factory as a standard hold greeting, or may be provided as a default greeting by the base station 5. This greeting may be played back to a caller each time a call is received when the mobile communications device with hold mode 100 is configured in the hold mode. The greeting may be communicated to the caller by electronic signals inserted directly on the data stream relayed to the transmission/reception antenna, rather than re-created audibly and transmitted through the microphone 165 of the mobile communications device with hold mode 100.

The hold indicator generator 180 may be a device which generates an indicator, such as a signal indicating to the user that an incoming call has been received and has been placed on hold. The hold indicator may be, for example, a distinct sound or a series of distinct sounds, such as a single ring of the mobile communications device with hold mode 100, a silent vibration, or a visual signal, such as a blinking light.

Hold routine 190 may contain hardware and/or software for performing the hold routine. The hold routine may include disabling the microphone, playing back the hold greeting stored in the hold greeting memory 120, and/or holding the connection for a predefined period of time. The connection may be held by having the mobile communications device with hold mode 100 transmit the appropriate data to the transmission/reception antenna 10 and base station 5, indicating that the call is underway. During this period, the connection may be maintained, although no audio information may be transmitted over the wireless connection.

Alternatively, the hold greeting and hold routine may be stored in the base station 5, rather than in the mobile communications device with hold mode 100. The hold greeting may be stored and replayed by the base station 5 in a manner similar to a voice message greeting recorded by the user, inviting incoming callers to leave a voice message. In this situation, the base station 5 may also store and execute the hold routine 190. The base station 5 may send a signal instructing the mobile communications device with hold mode 100 to disable its microphone 165, may play the hold greeting to the user, and may maintain the open connection with the mobile communications device with hold mode 100. The microphone 165 may be enabled when the user pushes a button on keypad 175, to answer the call being held by the base station 5.

The term "hold mode" as described herein refers to a mode in which the call may be connected although no voice transmission may take place. The hold mode routine thereby differs from "call waiting" or voice mail capabilities presently available on some cell phones, because, among other things, the call connection is established in the hold mode, whereas it is not yet established in the call waiting and voice mail services. As a result, the user may be charged for the period that an incoming call is held in hold mode, depending on the charging policies of the communications service provider. In contrast, connection charges are typically not accrued to the mobile communications device user when using the call waiting or voice mail services. Although the systems and methods described here may have the disadvantage of accruing connect time charges for periods when no conversation is underway, in many situations, the increased expense is well worth the improvement in communications and reduction in missed calls.

The caller ID module 160 may determine the phone number or other identifying information of the incoming caller, and may display the information on display 170. This information may assist the user in deciding whether to answer the call immediately, to place the caller on hold, or to let the voice message service take a voice message from the caller. It should be understood that the caller ID module 160 is optional, and is not necessary to the functioning of the mobile communications device with hold mode 100.

Figure 3:
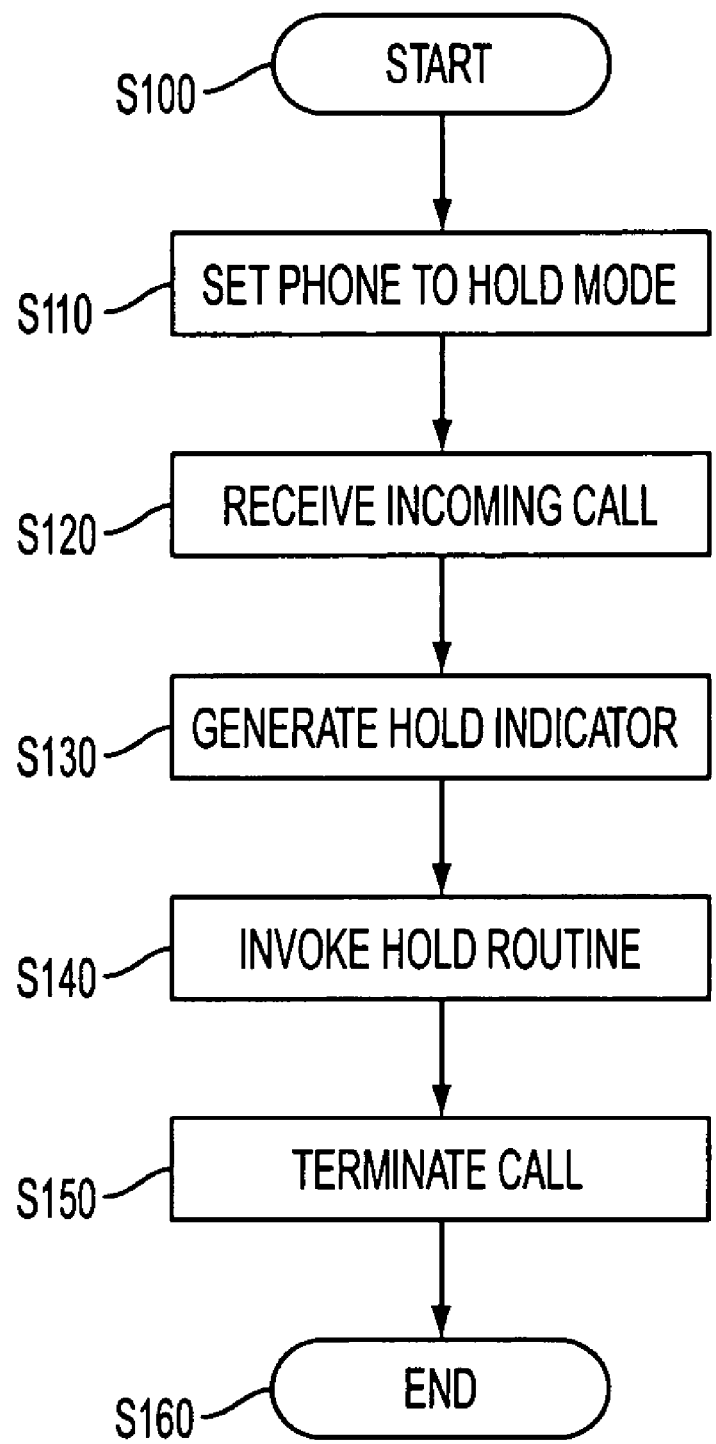
FIG. 3 is a flowchart illustrating a first exemplary mode for using the mobile communication device with hold mode.

The hold mode of mobile communications device with hold mode 100 may be activated in any of a number of ways. One exemplary method for activating the hold mode is shown in FIG. 3. FIG. 3 illustrates a method in which the hold mode may be activated by the user before a call is received. For example, the hold mode may be activated upon entering a church, a theater or a library, for example, to avoid having the phone ring as usual inside these locations.

The method starts in step S110, and proceeds to step S120, where the phone may be set to the hold mode. This selection may occur by the depression of a dedicated hold key, by the depression of a sequence of keys, or by uttering certain signal word or words into the microphone, which indicate to the mobile communications device with hold mode that the hold mode is desired. In step S120, an incoming call may be received. The process then proceeds to step S130, where upon receipt of an incoming call, a hold indicator of the mobile communications device may be generated, for example, a single ring, or a particular sequence of sounds, that is distinct from the normal ring of the mobile communications device. As an alternative, a less intrusive indicator, such as a vibration, a somewhat muted ring, or a visual signal may be generated to alert the user that an incoming call has been received in hold mode.

In step S140, the hold routine may be invoked. The call may be terminated in step S150, and the process may end in step S160.

Figure 4:
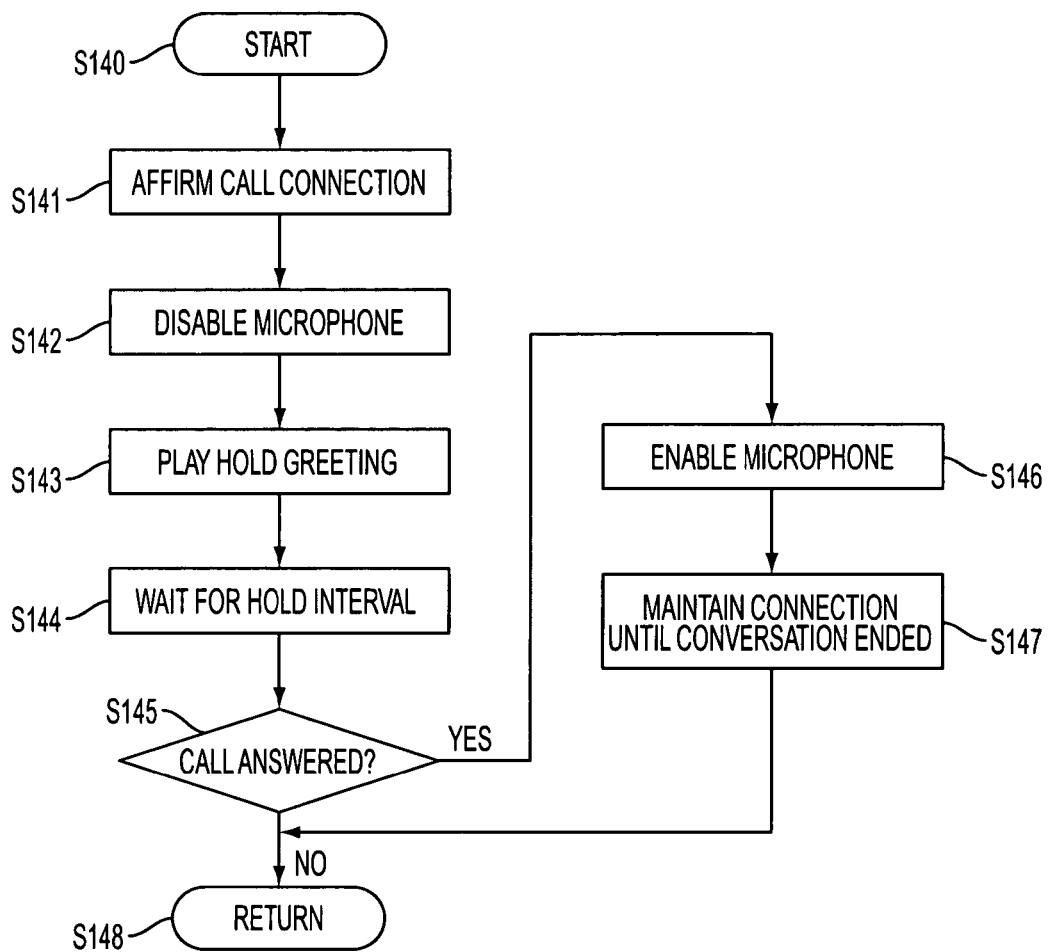
FIG. 4 is a flow chart illustrating an exemplary hold routine.

FIG. 4 is a flow chart describing in greater detail an exemplary hold routine. These steps generally correspond to step S140 in FIG. 3. The process may begin with step S140 and proceed to step S141, where the phone connection may be confirmed. This step may include the transmission of appropriate data to the transmission/reception antenna, indicating that the call has been received and is underway by the mobile communications device with hold mode. The transmission/reception antenna and base station may then maintain the connection between the caller and the user of the mobile communications device.

The method then proceeds to step S142, where the microphone of the mobile communications device with hold mode may be disabled. This prevents the caller from overhearing unintended conversations, or ambient noise, at the location of the mobile communications device with hold mode. In step S143, the hold greeting may be generated for the caller. The hold greeting may greet the caller, and may give an indication as to when the caller can expect the call to be answered. Since the microphone may have been disabled, the hold greeting may be generated and transmitted electronically from the hold greeting memory. The method then proceeds to step S144, where the mobile communications device may wait for a predefined interval for the user to answer the call. During this interval, the user may or may not accrue connection charges as the call may be treated as underway by the transmission/reception antenna and base station, or may be treated differently by the communications provider.

A determination is made in step S145, whether the call has been answered. If so, control proceeds to step S146, where the microphone of the mobile communications device with hold mode is enabled. The connection is maintained in step S147 until the conversation is ended. Control then returns to step S150 of FIG. 3, where the call may then be terminated. If the call has not been answered, the control returns directly to step S1150 of FIG. 3, where the call is terminated. The process ends in step S160.

Figure 5:
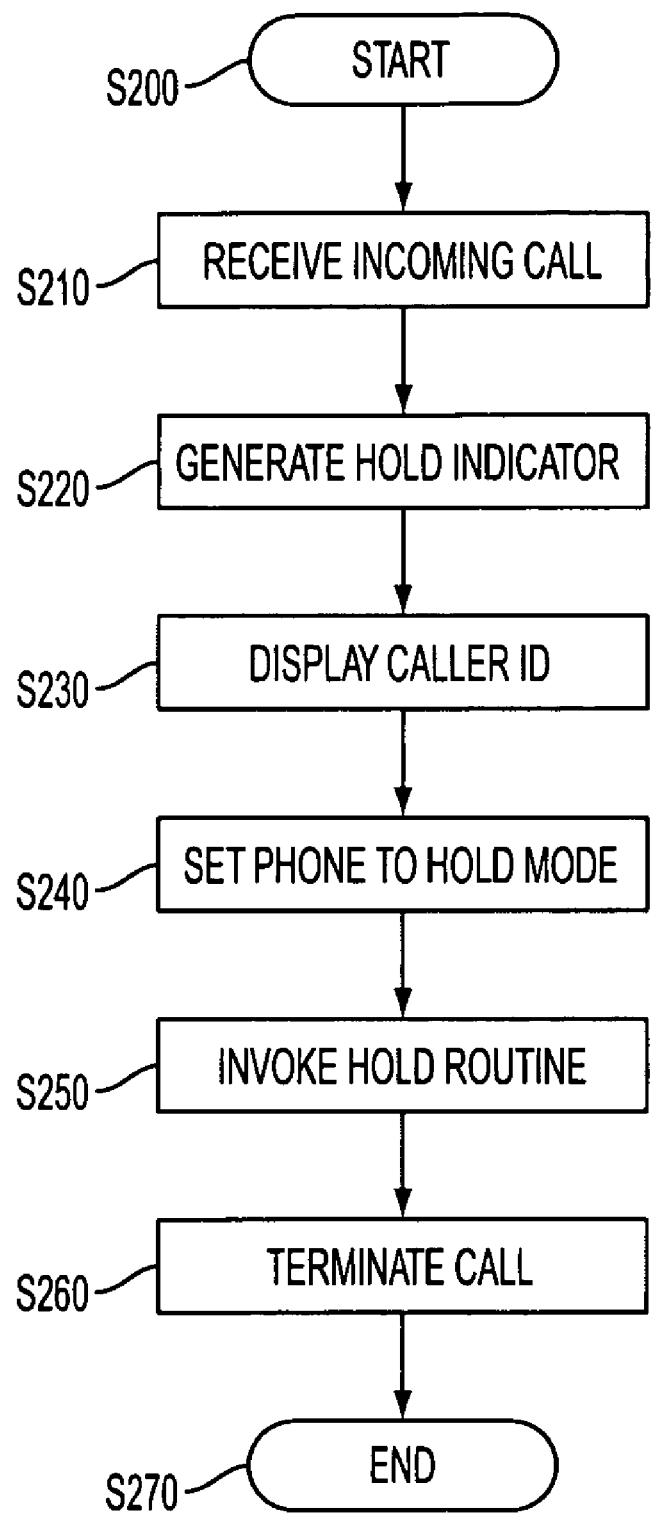
FIG. 5 is a flow chart illustrating a second exemplary mode for using the mobile communication device with hold mode.

FIG. 5 illustrates an alternative process for activating the hold mode on a mobile communications device with hold mode. The process starts in step S200, and continues to step S210, where an incoming call may be received. In step S220, the usual ring may be generated, followed by a display of information related to the identity of the caller in step S230. Based on this information, the user may elect to set the phone to hold mode in step S240. The phone may then invoke a hold routine such as that detailed in FIG. 4, in step S250. The call may be terminated in step S260, and the process ends in step S270.

There may also be situations in which the user is unable to answer the call within the predefined interval of the hold mode. In this situation, rather than terminating the call, the exemplary method illustrated by FIG. 6 may be used, in which a loop is added to give the user an indefinite period of time in which to answer the call.

Figure 6:
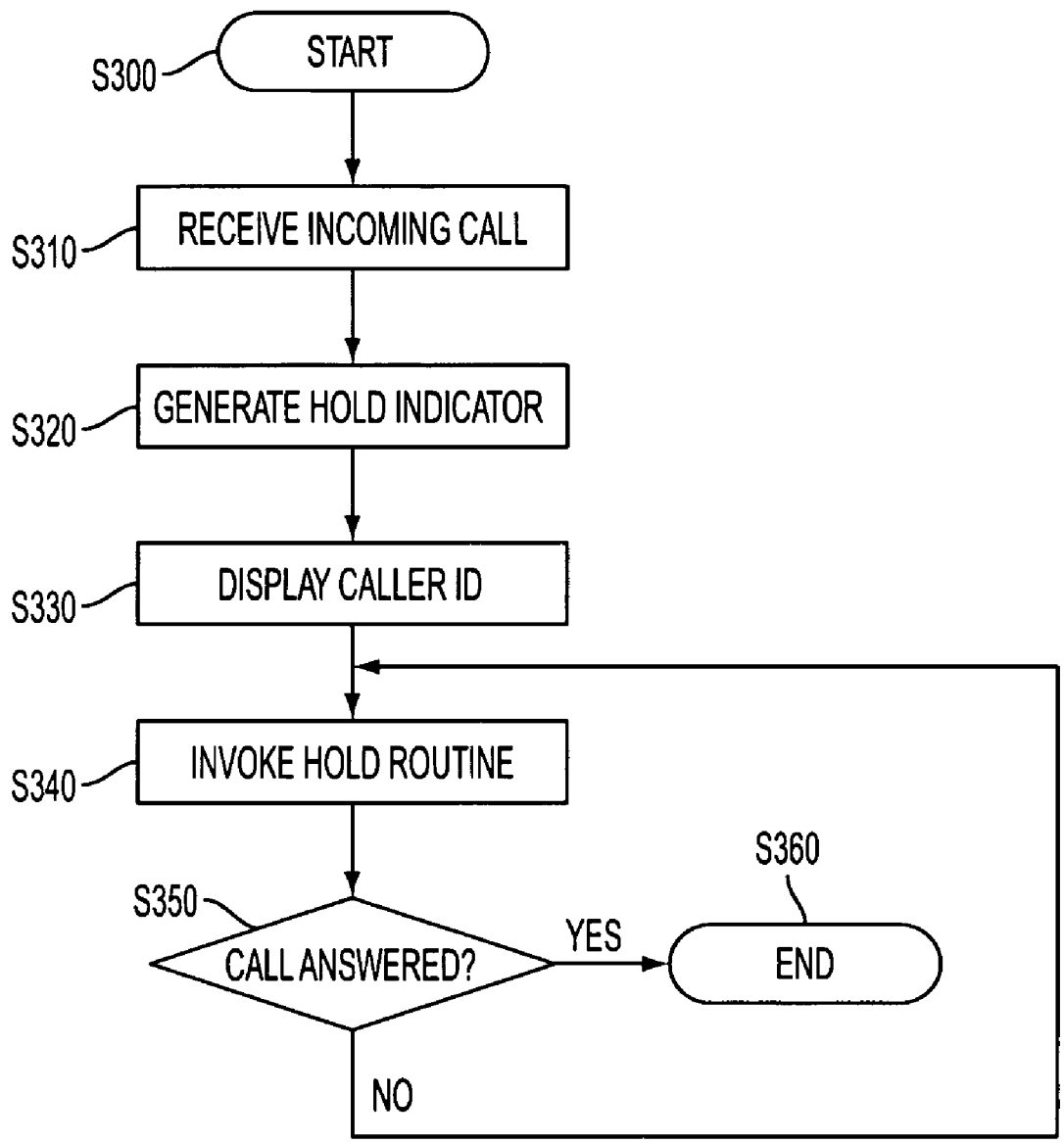
FIG. 6 is a flow chart illustrating a first exemplary method for implementing the hold routine of FIG. 4.

In FIG. 6, the process assumes that the mobile communications device with hold mode has been placed in the hold mode before the reception of an incoming call, as illustrated by the exemplary activation method of FIG. 3. The method of FIG. 6 starts in step S300, and continues to step S310, where the incoming call may be received. The process then proceeds to step S320, where the hold indicator, for example, a single ring or a silent vibration, may be generated. The method may then display the caller identification information in step S330. In step S340, the hold routine of, for example, FIG. 4 may be invoked. After the execution of the hold routine, a determination may be made in step S350 whether the call has been answered. If not, control returns to step S340 where the hold routine may again be invoked. This loop may continue until the call is answered from hold mode, and the process ends in step S360.

Alternatively, in order to limit the connect time for which the user may be billed, a loop may be added to the process shown in FIG. 6, such that the hold mode may be invoked only a predefined number of times before the call is terminated as in the method described in FIGS. 3 and 5.

Figure 7:
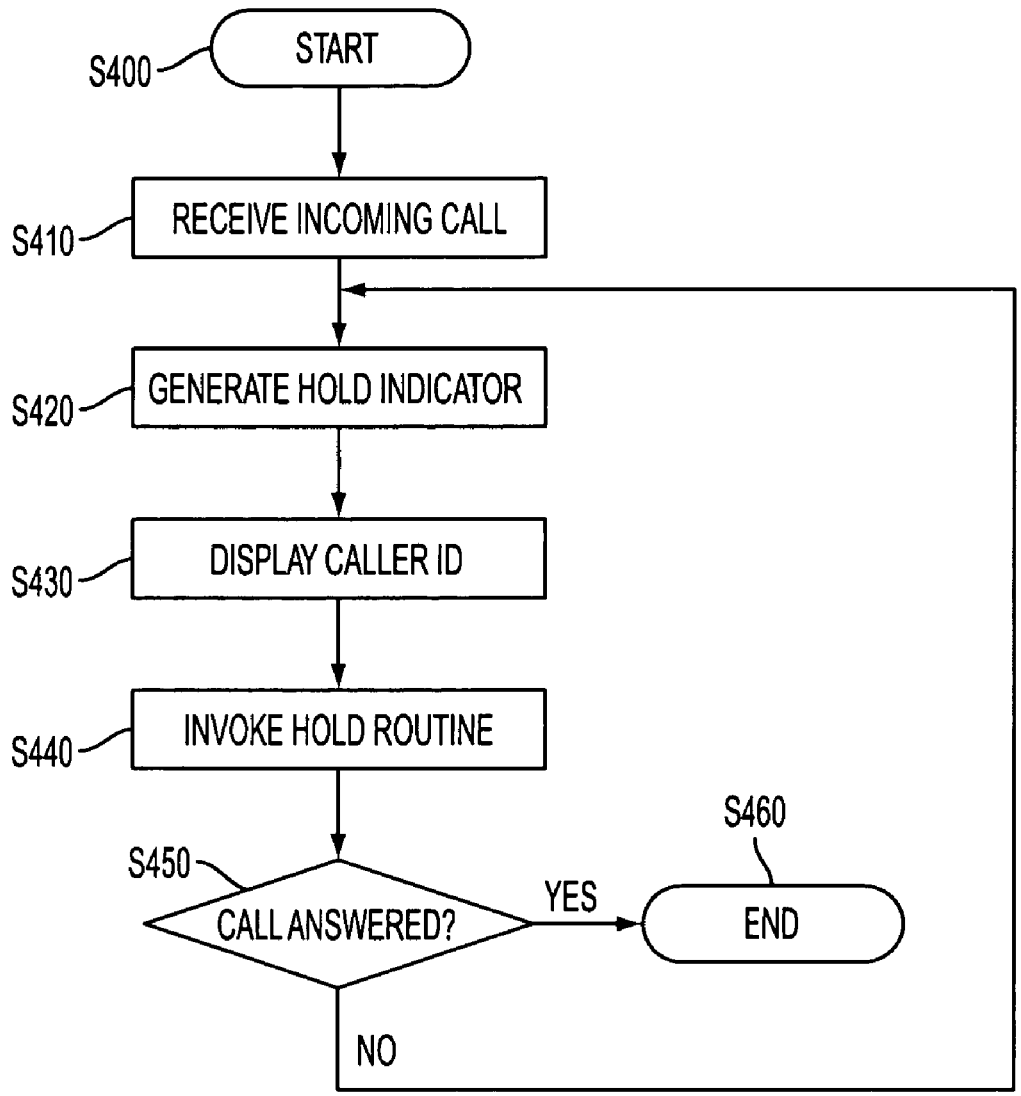
FIG. 7 is a flow chart illustrating a second exemplary method for implementing the hold routine of FIG. 4.

The exemplary method illustrated by FIG. 7 is similar to that described by FIG. 6, with the exception that the hold indicator, for example, the single ring or the vibration, may be generated each time the hold routine in invoked. That is, as shown in FIG. 7, the process starts in step S400, and proceeds to step S410. In step S410, the incoming call may be received. The process then proceeds to step S420, where the hold indicator may be generated, and then to step S430, where the caller information may be displayed. Thereafter, in step S440, the hold routine may be invoked. Upon completion of the hold routine, in step S450, a determination may be made whether the call has been answered. If not, control returns to step S420, where the hold indicator may be generated, and then to step S430 where the caller information may be displayed. Therefore, in the method of FIG. 7, the user may be alerted by the hold indicator that the caller is still on the line, and still waiting for the user to answer. The periodic generation of the call indicator in FIG. 7 may serve to remind the user that the call still has not been answered.

The method described in FIG. 7 may be combined with a conventional voice message service, in order to record a voice message in the event that the user cannot answer the held call within a predetermined amount of time. An example of such an implementation is illustrated in FIG. 8.

Figure 8:
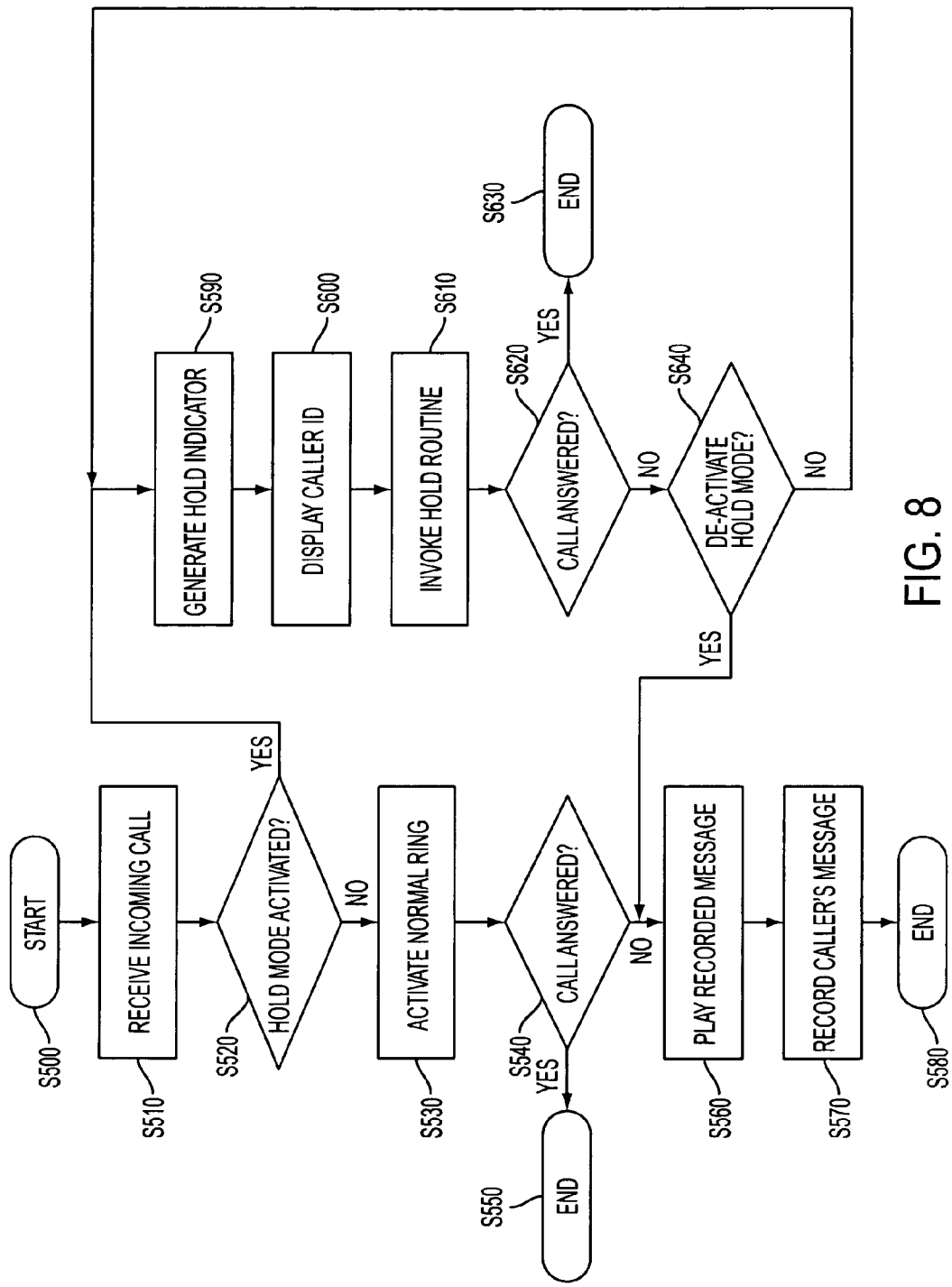
FIG. 8 is a flow chart illustrating an exemplary combination of the hold routine of FIG. 4 with a usual voice message routine.

The exemplary method of FIG. 8 begins in step S500, and proceeds to step S510, where the incoming call may be received. In step S520, a determination may be made whether the hold mode has been activated. If not, control may continue to step S530, where a normal ring may be activated. In step S540, a determination may be made whether the call has been answered. If so, the process ends in step S550. If the call has not been answered, a prerecorded message may be played to the caller in step S560, inviting the caller to leave a message. In step S570, the message from the caller may be recorded, to be retrieved by the user at a convenient time. The process ends in step S580.

If the determination is made that the hold mode has been activated in step S520, the process proceeds to step S590, where the hold indicator, for example, a single ring or a vibration, may be generated. In step S600, the caller identification information may be displayed to the user. In step S610, the hold routine of FIG. 4, for example, may be invoked. In step S620, a determination may be made whether the call has been answered. If so, the process ends in step S630. If not, control proceeds to step S640, wherein a determination may be made whether the hold mode has been de-activated. The de-activation may be accomplished either by the user depressing a de-activation button, or by the process having looped through the hold routine a maximum number of times. In either case, if the hold mode has been de-activated, control may continue to step S560, where the pre-recorded message may be played to the caller, inviting the caller to leave a voice message, followed by the recording of the voice message in step S570. If the hold mode has not been de-activated, control returns to step S590, where the hold indicator may again be generated, followed by the display of the caller identification in step S600.

It should be clear that the steps outlined in FIGS. 3-8 above may not necessarily be executed in the specific order indicated in the figures, and that a number of the steps may be optional. For example, the caller identification information may be displayed prior to, or concurrently with, generation of the hold indicator, rather than subsequently. In addition, the display of the caller identification may be omitted for users who do not subscribe to such a service.

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art which are also intended to be encompassed by the following claims.

What is claimed is:

1. A mobile communications device, comprising:
   a microphone;
   a hold mode selector; and
   a microprocessor configured to determine whether a hold mode is active for the mobile communications device and to execute one of first and second hold mode routines according to the result of the determination of whether a hold mode is active, wherein
   the microprocessor, under the first hold mode routine, upon the mobile communications device receiving an incoming call from a caller at another device and according to the hold mode of the communications device, controls the mobile communications device to confirm a call connection with the other device before signaling a user of the mobile communications device that the incoming call has been connected and has been put on hold, the first hold mode routine configured to ensure that the microphone is disabled,
   the microprocessor, under the second hold mode routine, upon the mobile communications device receiving an incoming call from a caller at another device and according to the hold mode of the communications device, controls the mobile communications device to confirm a call connection with the other device before signaling a user of the mobile communications device that the incoming call has been connected and has been put on hold, the second hold mode routine configured to ensure that the microphone is enabled, and
   the call connection enables the caller to hear the user's voice and ambient noise around the user when the microphone of the mobile communications device is not disabled.

2. The mobile communications device of claim 1, further comprising a hold greeting memory that stores a hold greeting, which is played by the microprocessor to an incoming caller when the hold mode has been selected, wherein the hold greeting informs the caller that the user will answer within a few moments and directs the caller to stay on line.

3. The mobile communications device of claim 1, further comprising a caller identification module that determines information regarding an identity of a caller and displays the information on a display.

4. The mobile communications device of claim 1, wherein the hold mode selector comprises at least one of a key on a keypad, a sequence of keys on a keypad, and a circuit that determines whether at least one predetermined word is uttered.

5. The mobile communications device of claim 1, further comprising a device which generates a hold indicator, that indicates that the hold mode is active.

6. The mobile communications device of claim 1, further comprising a microphone disabler, that disables a microphone of the device when the hold mode is active.

7. The mobile communications device of claim 5, wherein the hold indicator comprises at least one of a sound and a vibration.

8. A mobile communications system, comprising:
   a mobile communications device having a microphone; and
   a mobile communications base station that executes first and second hold mode routines, wherein
   the mobile communications base station, under the first hold mode routine, upon the mobile communications device receiving an incoming call from a caller at another device, and according to a hold mode of the mobile communications device, controls the mobile communications device to confirm a call connection with the other device before signaling a user of the mobile communications device that the incoming call has been connected and has been put on hold and disables the microphone;
   the mobile communications base station, under the second hold mode routine, upon the mobile communications device receiving an incoming call from a caller at another device, and according to the hold mode of the mobile communications device, controls the mobile communications device to confirm a call connection with the other device before signaling a user of the mobile communications device that the incoming call has been connected and has been put on hold and enables the microphone, and
   the call connection enables the caller to hear the user's voice and ambient noise around the user when the microphone of the mobile communications device is not disabled.

9. The mobile communication system of claim 8, further comprising a hold mode indicator in the mobile communications device, the hold mode indicator indicating to a user that an incoming call has been received and that the mobile communications device is in the hold mode.

10. The mobile communications system of claim 8, further comprising a hold mode selector on the mobile communications device that transmits a signal to the mobile communications base station to execute the hold mode routine.

11. The mobile communications system of claim 10, wherein the hold mode selector comprises at least one of a key on a keypad, a sequence of keys on a keypad, and a circuit that determines whether at least one predetermined word is uttered.

12. The mobile communications system of claim 8, further comprising a hold greeting message stored in the mobile communications base station, and played to an incoming caller when the hold mode routine is executed, wherein the hold greeting message informs the caller that the user will answer within a few moments, and directs the caller to stay on line.

13. A method for operating a mobile communications device, comprising:
   determining whether a hold mode is active for the mobile communications device;
   generating a hold mode indicator when the hold mode is active; and
   invoking a first hold mode routine in response to an incoming call when the determination whether a hold mode is active indicates that a first hold mode is active, the first hold mode routine comprising the steps of:
      upon receiving an incoming call from a caller at another device, confirming a call connection with the other device before signaling a user of the mobile communications device that the incoming call has been connected and has been put on hold;
      disabling a microphone of the mobile communications device according to the first hold mode, wherein the call connection prevents the caller from hearing the user's voice and ambient noise around the user when the microphone of the mobile communications device is muted;
   invoking a second hold mode routine in response to an incoming call when the determination whether a hold mode is active indicates a second hold mode is active, the second hold mode routine comprising the steps of:
      upon receiving an incoming call from a caller at another device, confirming a call connection with the other device before signaling a user of the mobile communications device that the incoming call has been connected and has been put on hold;
      enabling the microphone of the mobile communications device according to the second hold mode, wherein the call connection enables the caller to hear the user's voice and ambient noise around the user when the microphone of the mobile communications device is not muted.

14. The method of claim 13, wherein invoking a hold mode routine comprises:
   (1) disabling a microphone;
   (2) playing a hold greeting, wherein the hold greeting informs the caller that the user will answer within a few moments, and directs the caller to stay on line; and
   (3) maintaining the call connection for a predetermined amount of time.

15. The method of claim 14, further comprising repeating steps (2)-(3) at least one of a predetermined number of times and until the call is answered.

16. The method of claim 15, further comprising recording a voice message from a caller when the call is not answered within the predetermined number of times.

17. The method of claim 13, further comprising selecting the hold mode.

18. The method of claim 17, wherein selecting the hold mode comprises at least one of depressing a dedicated hold key, depressing a sequence of keys, and uttering a predefined word.

19. The method of claim 13, wherein generating a hold indicator comprises at least one of generating at least one sound and generating a vibration of the mobile communications device.

20. The method of claim 14, wherein maintaining the call connection comprises transmitting data to a transmission/reception antenna, indicating that the call is underway.

* * * * *